Patented Sept. 5, 1944

2,357,394

UNITED STATES PATENT OFFICE 2,357,394

PHOTOGRAPHIC EMULSION

Alfred Fröhlich and Wilhelm Schneider, Dessau, Germany, assignors to General Aniline & Film Corporation, New York, N. Y., a corporation of Delaware No Drawing. Application July 14, 1941, Serial No. 402,422. In Germany July 12, 1940

10 Claims. (Cl. 95—6)

Our present invention relates to a photographic emulsion, and more particularly to a silver halide emulsion for color photography.

For the production of color photographic images arylamides or alkylamides of aromatic hydroxy acids have been proposed as dyestuff formers for the blue image; if desired, the amines used in the preparation of these amides may serve to impart advantageous properties, for instance, fastness to diffusion with respect to colloids or a special solubility, to the dyestuff formers. Such dyestuff formers include, for instance 1-hydroxy-2-naphthoic acid anilide, 1-hydroxy-2-napthoic acid anisidide, 1-hydroxy-2-naphthoic acid naphthylamide, 1 - hydroxy-2-naphthoylaminochrysene-4-sulfonic acid, 1.2.3.4-xylenol-carboxylic acid toluidide, bis-(1-hydroxy-2-naphthoyl)-4'4''-diaminodiphenylurea, bis - (1-hydroxy-2-naphthoyl)-4'4''-diaminostilbene, bis-(1-hydroxy-2-naphthoyl)-4'4''-diaminodiphenyl-3'-stearylamine, bis-(1'-hydroxy-2'-naphthoyl)-1.4-diaminophenyl, 1-hydroxynaphthalene-6-sulfododecylamide, 1-hydroxy-5 - 6 - dimethoxy - 2-benzoylaminodianisidide, 1.2.3.4 - xylenolcarboyl-aniline-4'-sulfonic acid, 1-hydroxy-2-naphthoyl-aminobenzthiazole, 1-hydroxy-2 - naphthoylamidobenzimidazole, 1-hydroxy-2-naphthyl-2'-benzoxazole, and 1-hydroxy-4-chloro-2-naphthoyl-amidobenzoic acid. On the color development with dialkylaminoaniline or homologous color developers the above-mentioned dyestuff components produce a purely blue dyestuff the absorption maximum of which is at about 660 m$\mu$: this dyestuff accordingly transmits the visible red of long-wave length and absorbs considerable parts of the green spectral region. These absorption properties of the blue 1-hydroxy-8-stearylamino-naphthalene-4-6-disulfonic acid dyestuff are sometimes disadvantageous especially when the color image is to be used in a copying process. In this case it is of advantage if the distances of the absorption maxima of the image dyestuffs are as great as possible, i. e. that the absorption maximum of the blue dyestuff is shifted as far as possible towards the range of the long waves and that the absorption curve thereof shows a steep descent towards the range of the short waves so as to render the overlapping with the absorption region of the purple dyestuff as small as possible. This means that a greenish-blue dyestuff is used for this purpose instead of a purely blue dyestuff. As dyestuff formers which produce greenish-blue dyestuffs there have already been proposed halogenated naphthols, for instance pentabromonaphthol or such phenols as possess in the o-position a lateral chain which has a double bond adjacent to the substitution position such as o-hydroxycinnamic acid. These proposals have the disadvantage that the number of the available components is very small, for a further substitution resulting in an extension of the intended use or in another improvement is hardly possible with the highly halogenated naphthols due to steric hindrance, and with compounds of the type of o-hydroxycinnamic acid dyestuff formers complying with all requirements as to solubility, fastness to diffusion etc. may be moreover prepared by further reactions only with difficulty.

It is an object of our invention to provide dyestuff formers for blue dyestuffs which show an absorption maximum shifted towards the long-wave region and a steep descent of the absorption curve towards the short-wave region. Further objects of the invention will be apparent from the description following hereinafter.

These objects are accomplished by using condensation products prepared from aromatic hydroxy compounds and derivatives of benzene substituted in the 1, 3, and 5-positions as dyestuff components for blue dyestuff images. Such aromatic hydroxy compounds capable of coupling, for instance, include aromatic hydroxycarboxylic acids and aromatic hydroxy sulfonic acids such as naphtholcarboxylic acids, xylenolcarboxylic acids, hydroxytoluyl acids, naphthol sulfonic acids, hydroxyquinoline carboxylic acids, hydroxyindene carboxylic acids or hydroxybenzthiazole carboxylic acids. As benzene derivatives such aromatic amines are, for instance, suited as exhibit any substituents in the 3- and 5-positions beside the amino group. It is evident that with the large number of 1.3.5-substituted aromatic amines dyestuff formers having quite different properties can be prepared by suitably selecting the substituents for the 3- and 5-positions and introducing further radicles in addition to the 3.5-substituents.

A comparatively easily water-soluble dyestuff former for blue having a purely blue-green tint is, for instance, obtained by reacting xylenol carboxylic acid chloride with aminoisophthalic acid. The water-solubility of this component can be varied by replacing the aminoisophthalic acid by semiesters or diesters thereof from low or high molecular weight alcohols. By using alcohols of sufficiently high molecular weight it is possible to produce compounds which are dyestuff formers fast to diffusion and can be added to a silver halide emulsion before casting.

The possibility to influence the properties of the components for blue-green is particularly great, if such amines are used as carry a nitro group or an exchangeable halogen in one of the 3- and 5-positions. When 1.3-dinitro-4-chlorobenzene-5-sulfonic acid is, for instance, to be employed, it is possible first to substitute for the halogen an amine which shall impart fastness to diffusion to the final dyestuff formers or an amine which produces an especial solubility and then to use the two nitro groups for the introduction of dyestuff former radicles.

For the preparation of dyestuff components fast to diffusion certain radicles may be introduced into the molecule of the components, for instance according to the patents:

U. S. Patents 2,186,852, 2,186,719, 2,186,734, 2,186,851, 2,186,733, 2,186,732, 2,186,847 dated January 9, 1940; U. S. Patents 2,179,238, 2,179,244, 2,178,612 dated November 7, 1939; U. S. Patents 2,280,722, 2,292,575 and 2,303,928 and French Patents 344,648, 344,649, 844,637, and U. S. Patent applications 284,258, filed July 13, 1939, 327,628 filed April 3, 1940, 333,814 filed May 7, 1940, 335,144 filed May 14, 1940, 341,180 filed June 18, 1940, and 362,592 filed October 24, 1940.

Further dyestuff formers of the present invention are, for instance, bis-3,5(4'-sulfo-1'-hydroxy-2'-naphthoylamino) - benzoyl octadecylamine of the following chemical formula:

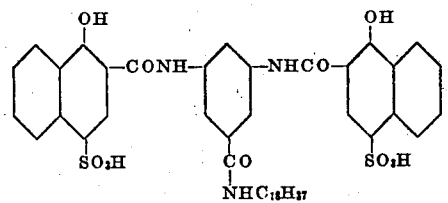

bis-3,5-(1'-hydroxy - 2' - naphthoylamino) - benzoyl-4''-amino phenyl acetic acid of the following chemical formula:

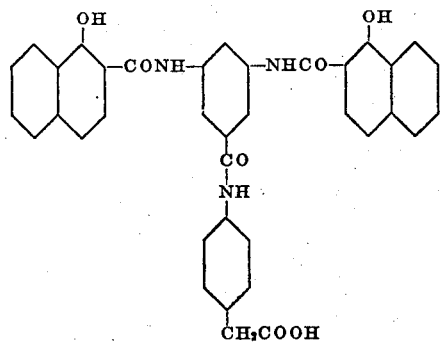

bis-3,5-(1'-hydroxy - 2'-naphthoylamino) - N - dodecyl benzene sulfonamide of the following chemical formula:

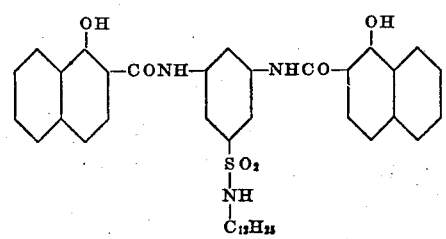

bis-3,5-(1'-hydroxy - 2' - naphthoylamino) - benzoyl-4''-amino benzoic acid of the following chemical formula:

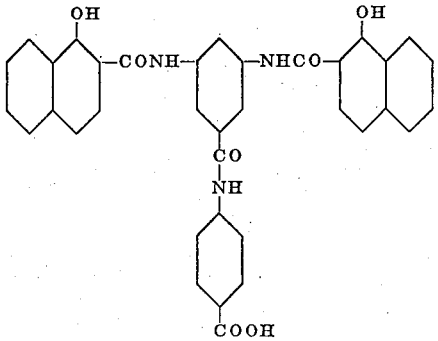

1-lauroylamino-3,5-bis - (2' - hydroxy - 3'.4' - dimethyl-5' sulfobenzoylamino) - benzene of the following chemical formula:

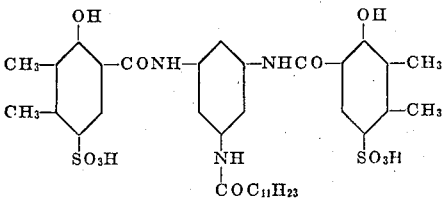

1-acetylamino-3,5-bis-(2'-hydroxy-3'.4'- dimethoxy-benzoylamino)-benzene of the following chemical formula:

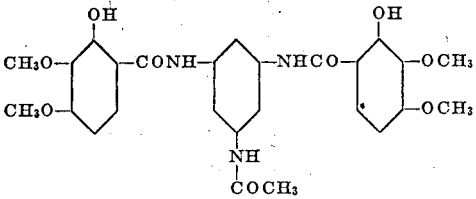

2,6-bis-(1'-hydroxy-2'-naphthoylamino)-3,4 - dichloro-N-dedecylaniline of the following chemical formula:

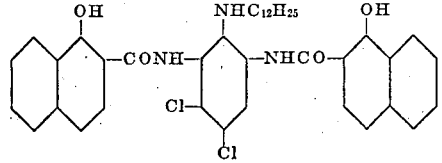

(1'-hydroxy-2'- naphthoylamino) - benzene - 3,5-disulfonic acid of the following chemical formula:

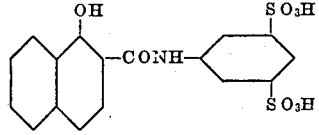

These components are prepared in general by condensing a suitable dinitro carboxylic acid ester with a compound capable of producing fastness to diffusion, for instance, an amine, reducing the nitro groups to amino groups, then condensing these groups with a compound capable of coupling, for instance, a hydroxy acid, and if necessary, finally sulfonating the product thus obtained with concentrated sulfuric acid. As a rule the sulfo group will enter into the molecule of the coupling radicle in the p-position to the hydroxy group thereof.

Another method for the production of these components starts from the corresponding halogen-nitrobenzenes. It is advantageous to arrange the halogen, nitro and, if necessary, acid groups in the benzene nucleus in addition to the desired 1-, 3- and 5-positions of the substituents in such a manner that the linkage of the halogen is rendered loose and the halogen can be replaced by a radicle yielding fastness to diffusion, for instance, an aliphatic amine of relatively high molecular weight. The nitro groups are then reduced and linked to a color former, for instance, an aromatic hydroxy-carboxylic acid and, if necessary, finally sulfonated as above-mentioned.

The dyestuff formers of the invention may also be added to a photographic developer, for instance, to a soda-alkaline solution of dimethylaminoaniline, which on development of the silver halide emulsion yields a blue-green dyestuff having the spectral requirements mentioned above. Components having radicles capable of producing fastness to diffusion may be added to photographic silver halide emulsion in any stage of the production thereof. These emulsions likewise yield a blue-green dyestuff image on exposure and color forming development.

The blue-green tint produced by the 1.3.5-substitution of the benzene derivative present as a lateral nucleus may be still affected and graduated by further substitutions of the ring system. Thus halogen atoms in the lateral nucleus, for instance, shift the tint still more towards the green whereas a shifting towards the pure blue is reached by ether groups. Moreover, the solubility, fastness to diffusion and crystallizability may be varied to any desired extent by introduction of suitable substituents into any position of the lateral nucleus already substituted in the 1-, 3- and 5-positions so that it is possible according to the present invention to select dyestuff components which comply with all requirements and form dyestuffs exhibiting the most favorable absorption.

The silver halide gelatin emulsions prepared by means of the present dyestuff components fast to diffusion may be cast to form single layers or worked up into a multi-layer material for color photography by superimposing on each other several silver halide emulsion layers containing dyestuff formers on one or both sides of the support. If necessary, the multi-layer materials may also be provided with filter layers, intermediate layers and anti-halation layers. The dyestuff images may be produced by a simple or a reversal development, that is as a negative or a positive, respectively.

We claim:

1. In a process of producing color photographic images by color forming development, the improvement which comprises producing in an exposed silver-halide emulsion a blue image by developing said emulsion in a primary aromatic amino developer and causing the oxidation products of such developer to react during development with a compound of the following formula

wherein A is hydroxyaryl, $n$ is selected from the class consisting of 1 and 2, B is phenyl which is linked in the 1-position through the amide linkage to the carbon atom of said hydroxy aryl which is ortho to the hydroxyl group thereof, said phenyl radicle being further substituted in the 5- and 3- positions by a substituent selected from the class consisting of substituted carbamyl, substituted carbonamide, substituted sulfamyl, substituted amino, sulfo and halogen and in the latter position by the second amide linkage when $n$ is 2.

2. A color photographic silver-halide emulsion containing as the color former for blue the product of the following formula

wherein A is hydroxyaryl, $n$ is selected from the class consisting of 1 and 2, B is phenyl which is linked in the 1-position through the amide linkage to the carbon atom of said hydroxy aryl which is ortho to the hydroxyl group thereof, said phenyl radicle being further substituted in the 5- and 3-positions by a substituent selected from the class consisting of substituted carbamyl, substituted carbonamide, substituted sulfamyl, substituted amino, sulfo and halogen and in the latter position by the second amide linkage when $n$ is 2.

3. The composition as defined in claim 2, wherein the substituent in 5-position renders said color former fast to diffusion.

4. A color forming developer for silver-halide emulsions comprising an aqueous solution containing a primary aromatic amino developing agent and a compound of the following formula

wherein A is hydroxyaryl, $n$ is selected from the class consisting of 1 and 2, B is phenyl which is linked in the 1-position through the amide linkage to the carbon atom of said hydroxy aryl which is ortho to the hydroxyl group thereof, said phenyl radicle being further substituted in the 5- and 3- positions by a substituent selected from the class consisting of substituted carbamyl, substituted carbonamide, substituted sulfamyl, substituted amino, sulfo and halogen and in the latter position by the second amide linkage when $n$ is 2.

5. In a process of producing color photographic images by color-forming development, the improvement which comprises producing in an exposed silver halide emulsion a blue-green image by developing said emulsion in a primary aromatic amino developer and causing the oxidation products of such developer to react during development with a compound of the following formula:

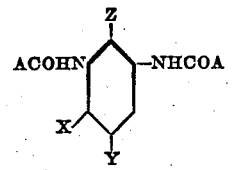

wherein

A is hydroxyaryl which is linked to the phenyl radical in ortho position to the hydroxyl group of said hydroxyaryl, Z is selected from the group consisting of hydrogen and alkylamino, X is selected from the class consisting of hydrogen and halogen and Y is selected from the class consisting of substituted carbamyl, substituted carbonamide, substituted sulfamyl, substituted amino, sulfo and halogen.

6. A color photographic silver halide emulsion containing as a color former for blue, the product of the following formula:

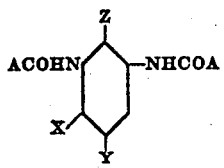

wherein

A is hydroxyaryl which is linked to the phenyl radical in ortho position to the hydroxyl group of said hydroxyaryl, Z is selected from the group consisting of hydrogen and alkylamino, X is selected from the class consisting of hydrogen and halogen and Y is selected from the class consisting of substituted carbamyl, substituted carbonamide, substituted sulfamyl, substituted amino, sulfo and halogen.

7. A color-forming developer for silver halide emulsions comprising an aqueous solution containing a primary aromatic amino developing agent and a compound of the following formula:

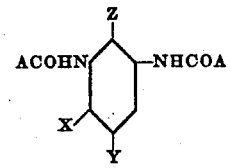

wherein

A is hydroxyaryl which is linked to the phenyl radical in ortho position to the hydroxyl group of said hydroxyaryl, Z is selected from the group consisting of hydrogen and alkylamino, X is selected from the class consisting of hydrogen and halogen, and Y is selected from the class consisting of substituted carbamyl, substituted carbonamide, substituted sulfamyl, substituted amino, sulfo and halogen.

8. A color photographic silver halide emulsion containing as the color former for blue the product of the following formula:

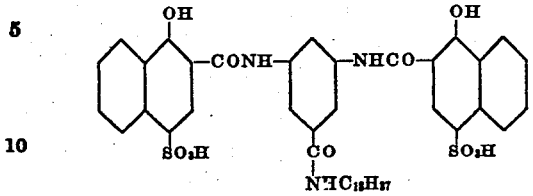

9. A color photographic silver halide emulsion containing as a color former for blue the product of the following formula:

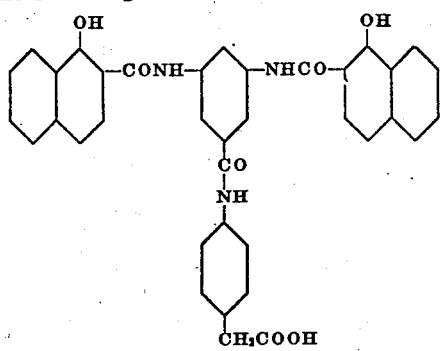

10. A color photographic silver halide emulsion containing as a color former for blue the product of the following formula:

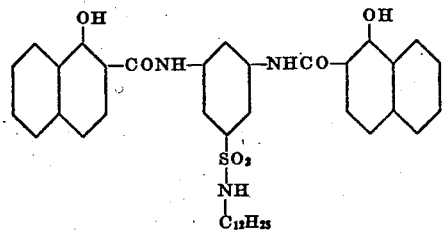

ALFRED FRÖHLICH.
WILHELM SCHNEIDER.